(12) United States Patent
Takahama et al.

(10) Patent No.: US 7,068,273 B2
(45) Date of Patent: Jun. 27, 2006

(54) RECORDING MEDIUM WHICH STORES 3D IMAGE PROCESSING PROGRAM, 3D IMAGE PROCESSOR, 3D IMAGE PROCESSING METHOD, AND VIDEO GAME MACHINE

(75) Inventors: Hajime Takahama, Kobe (JP); Hiroki Honda, Kobe (JP)

(73) Assignee: Konami Corporation, Tokyo (JP)

( * ) Notice: Subject to any disclaimer, the term of this patent is extended or adjusted under 35 U.S.C. 154(b) by 523 days.

(21) Appl. No.: 10/350,196

(22) Filed: Jan. 23, 2003

(65) Prior Publication Data

US 2003/0148802 A1 Aug. 7, 2003

(30) Foreign Application Priority Data

Jan. 28, 2002 (JP) ............................. 2002-018925

(51) Int. Cl.
*G06T 12/00* (2006.01)
(52) U.S. Cl. ...................................... 345/423
(58) Field of Classification Search ................. 345/423
See application file for complete search history.

(56) References Cited

U.S. PATENT DOCUMENTS

| 5,428,718 | A | 6/1995 | Peterson et al. |
| 6,188,408 | B1 | 2/2001 | Suzuoki |
| 6,469,701 | B1 * | 10/2002 | Gumhold ............... 345/419 |
| 6,707,452 | B1 * | 3/2004 | Veach ..................... 345/423 |
| 6,889,176 | B1 * | 5/2005 | Buttolo et al. .............. 703/1 |
| 2001/0019333 | A1 | 9/2001 | Suzuki |
| 2002/0145606 | A1 | 10/2002 | Levanon et al. |
| 2002/0167521 | A1 | 11/2002 | Suzuki |
| 2003/0078098 | A1 | 4/2003 | Yamaguchi |

FOREIGN PATENT DOCUMENTS

| EP | 0311081 | 4/1989 |
| JP | 7-271999 | 10/1995 |
| JP | 11-224352 | 8/1999 |
| JP | 2000-123195 | 4/2000 |
| JP | 2000-107584 | 7/2000 |
| JP | 2001 209823 | 8/2001 |

(Continued)

OTHER PUBLICATIONS

Lewis J P et al: "Pose Space Deformation: A Unified Approach to Shape Interpolation and Skeleton-Driven Deformation" Computer Graphics. SIGGRAPH 2000 Conference Proceedings. New Orleans, LA, Jul. 23-28, 2000, Computer Graphics Proceedings. SIGGRAPH, New York, NY: ACM, US, Jul. 23, 2000, pp. 165-172, XP001003552 ISBN: 1-58113-208-5 "p. 167, left-hand col., paragraph 1—paragraph 3" "figure 1".

(Continued)

*Primary Examiner*—Almis R. Jankus
(74) *Attorney, Agent, or Firm*—Jordan and Hamburg LLP

(57) ABSTRACT

The present invention combines patches (or objects) while preventing the generation of clearance. The program execution section 400 is comprised of the vertex coordinate setting section 401 for setting the vertex coordinates of each polygon constituting the first and second patches, the combining vertex selection section 402 for selecting the vertexes of the combining target polygons from the first and second patches, and the vertex coordinate change section for matching the vertex coordinates of the first patch side and the vertex coordinates of the second patch side for the vertex coordinates of the selected polygons.

17 Claims, 12 Drawing Sheets

FOREIGN PATENT DOCUMENTS

| | | |
|---|---|---|
| JP | 2002-092644 | 3/2002 |
| JP | 2002-260005 | 9/2002 |

OTHER PUBLICATIONS

Kraaijvanger M: "The Evolution of 3D Game Models Part 1" Game Developer, Miller Freeman, San Francisco, CA, US, vol. 7, No. 10, Oct. 2000, pp. 29-33, XP001082925 ISSN: 1073-922X "p. 30, right-hand col., line 7—line 18" "p. 31, left-hand col., line 7—right-hand col., line 24" "figures 6, 7".

"Famous 3D Animator" ONLINE!, 2000, XP002236850 Retrieved from the Internet: <URL: www.metamotion.com/software/motion-capture-software-famous-facial-2.htm> retrieved on Mar. 31, 2003! "the whole document".

Zippered Polygon Meshes from Range Images G. Turk et al. Computer Graphics Proceedings. Annual Conference Series 1994. SIGGRAPH 94 Conference Proceedings ACM New York, NY 311-318, sections 5, 5.2, fig. 5.

* cited by examiner

FIG.3

| DISTANCE SL (m) | DIVISION NUMBER DN |
|---|---|
| ~1000 | 10 |
| ~2000 | 8 |
| ~3000 | 6 |
| 3000~ | 4 |

RECORDING MEDIUM WHICH STORES 3D IMAGE PROCESSING PROGRAM, 3D IMAGE PROCESSOR, 3D IMAGE PROCESSING METHOD, AND VIDEO GAME MACHINE

BACKGROUND OF THE INVENTION

1. Field of the Invention

The present invention relates to three dimensional (hereinafter referred to as "3D") image processing technology for combining a first and second patches (or objects), which are comprised of a plurality of polygons respectively, to be applied to a video game machine, for example.

2. Description of the Related Art

Various game machines which display a plurality of objects, such as characters, in a pseudo 3D space created on a monitor screen are currently popular. To display game images in such a game machine, the vertex coordinates of polygons constituting an object (or a patch, which is a part of an object) are stored in a storage means, such as a CD-ROM, of the game machine in advance, the vertex coordinates of the object (or patch) in the field of view from the virtual camera viewpoint are read from the storage means, patched in the virtual 3D space, then is perspective-transformed into two-dimensional images, and is displayed on the monitor.

In order to realistically display complicated shaped objects, on the other hand, the number of polygons constituting a polygon model to express an object must be increased. Whereas for a simple shaped object (or patch), it is not desirable to increase the number of polygons, since this increases memory requirements and load of the CPU. So conventionally, the number of polygons constituting an object (or patch) is determined according to the shape of the object (or patch).

However, when objects (or patches) having a different number of polygons (number of vertexes of polygons) are patched in a virtual 3D space, a clearance, as shown in FIG. 12, is generated. FIG. 12 is an example of a diagram describing a clearance generated when two patches having a different number of polygons (number of vertexes of polygons) are patched. In FIG. 12, when the patch PM1 at the left and the patch PM2 at the right are combined, the clearance CL1 is generated at a position combining the patch PM1 and the patch PM2, since the patch PM1 has 10 vertexes, PV 101–PV 110, which become the target of combining, and the patch PM2 has 8 vertexes, PV 201–PV 208, which become the target of combining, (that is, the number of vertexes of polygons to be the combining target is different).

In this way the clearance, which is generated when objects (or patches) are combined, deteriorates the image quality of the game image, spoiling the reality of the image.

SUMMARY OF THE INVENTION

With the foregoing in view, it is an object of the present invention to provide a 3D image processing program stored in a recording medium, 3D image processor, 3D image processing method, and a video game machine for combining patches (or objects) while preventing the generation of clearance.

In order to achieve the above object, the present invention relates to a recording medium which stores a 3D image processing program for combining a first and second patches which are comprised of a plurality of polygons respectively, said 3D image processing program makes a computer to function as vertex coordinate setting means for setting the vertex coordinates of each polygon constituting the first and second patches, combining vertex selection means for selecting the vertexes of combining target polygons from the first and second patches respectively, and vertex coordinate change means for matching the vertex coordinates of the first patch side and the vertex coordinates of the second patch side for the vertex coordinates of the selected polygons.

According to the above invention, the vertex coordinate setting means sets the vertex coordinates of each polygon constituting the first and second patches, the combining vertex selection means selects the vertexes of the combining target polygons from the first and second patches respectively, and the vertex coordinate change means changes the vertex coordinates so that the vertex coordinates of the first patch side and the vertex coordinates of the second path side match for the vertex coordinates of the selected polygons. By matching the vertex coordinates of the combined target polygons of the first and second patches, the clearance between the first and second patches is combined as if it seamed, and the image quality of the images created by combining the first and second patches and the reality thereof are improved.

These and other objects, features, and advantages of the present invention will become more apparent upon reading the following detailed description along with the accompanying drawings.

BRIEF DESCRIPTION OF THE DRAWINGS

FIG. 3 is a table showing an example of the division number table;

DESCRIPTION OF THE PREFERRED EMBODIMENTS

Figure 1:
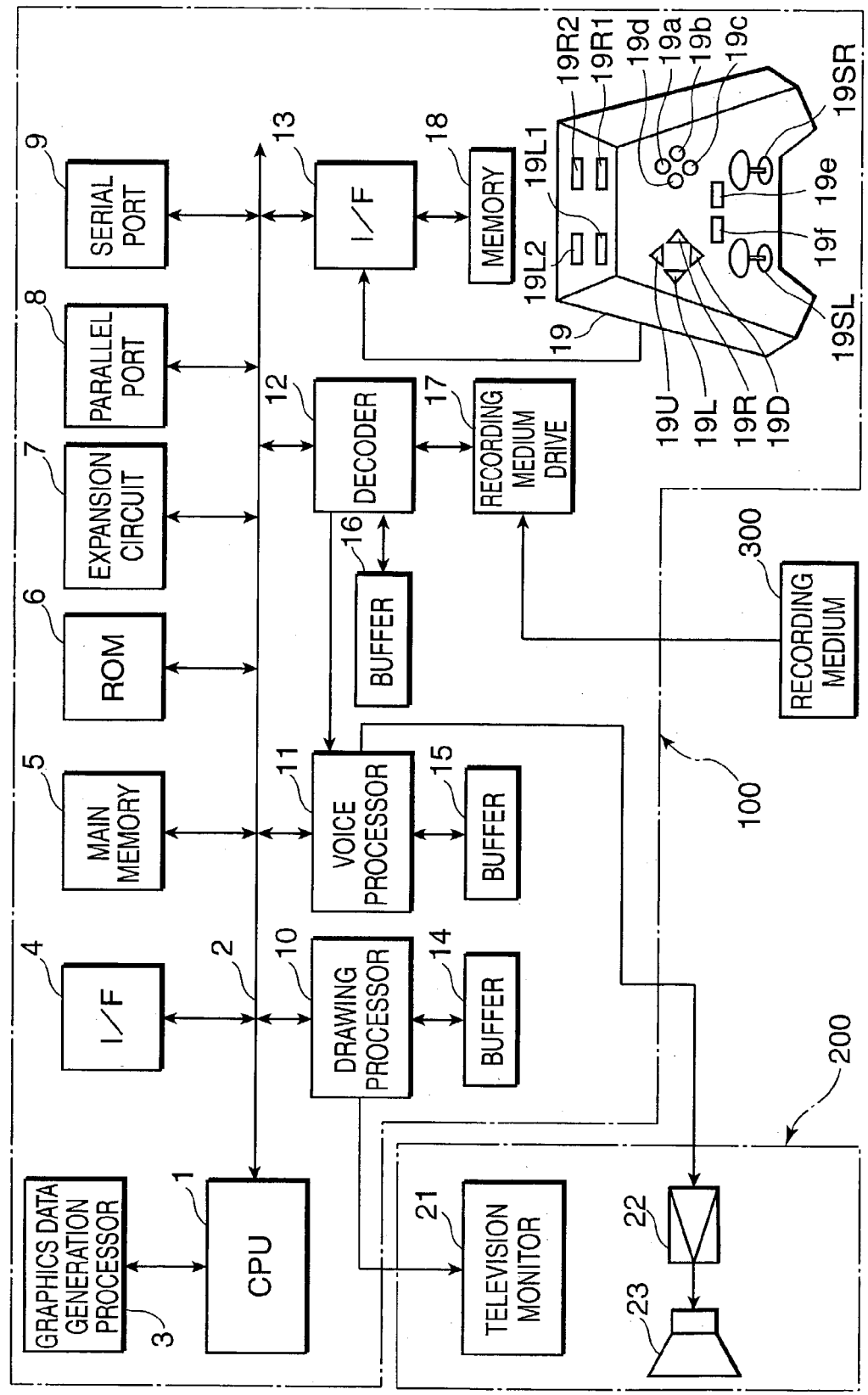
FIG. 1 is a block diagram depicting an embodiment of the video game machine to which the 3D image processor of the present invention is applied.

FIG. 1 is a block diagram depicting an embodiment of a video game machine to which the 3D image processor of the present invention is applied. In the description below, a home video game machine, which is comprised of a home video game machine connected to a home television, will be described as an example of a video game machine, but the present invention is not limited to this example, but can be applied to a business video game machine as well where the monitor is integrated, and a personal computer which functions as a video game machine by executing the video game program.

The video game machine shown in FIG. 1 is comprised of a home game machine 100 and a home television 200. In the home game machine 100, a computer readable recording medium 300 where the video game program, including the 3D image processing program of the present invention and the game data are recorded, is installed, and a game is executed by the video game program and the game data which is read as necessary.

The home game machine 100 is comprised of a CPU (Central Processing Unit) 1 (corresponding to a part of the game control means and game image generation means), bus line 2, graphics data generation processor 3 (corresponding to a part of the game image generation means), interface circuit (I/F) 4, main memory 5, ROM (Read Only Memory) 6, expansion circuit 7, parallel port 8, serial port 9, drawing processor 10, voice processor 11, decoder 12, interface circuit 13, buffers 14–16, recording medium drive 17, memory 18 and controller 19. The home television 200 is comprised of a television monitor 21, amplification circuit 22 and speaker 23.

The CPU 1 is connected to the bus line 2 and graphics data generation processor 3 (corresponding to a part of the game image generation means). The bus line 2 includes an address bus, data bus and control bus, and inter-connects the CPU 1, interface circuit 4, main memory 5, ROM 6, expansion circuit 7, parallel port 8, serial port 9, drawing processor 10 (corresponding to a part of the game image generation means), voice processor 11, decoder 12, and interface circuit 13.

The drawing processor 10 is connected to the buffer 14. The voice processor 11 is connected to the buffer 15 and the amplification circuit 22. The decoder 12 is connected to the buffer 16 and the recording medium drive 17. And the interface circuit 13 is connected to the memory 18 and the controller 19 (corresponding to the operation means).

The television monitor 21 of the home television 200 is connected to the drawing processor 10. The speaker 23 is connected to the amplification circuit 22. In the case of a business video game machine, the television monitor 21 (corresponding to the display means), amplification circuit 22, and the speaker 23 may be housed in one body along with each block constituting the home game machine 100.

When a video game machine is configured with a personal computer or workstation as the core, the television monitor 21 corresponds to the display for a computer. The expansion circuit 7, drawing processor 10 and voice processor 11 correspond to a part of the program data recorded in each recording medium 300 or hardware on the expansion board inserted into the expansion slot of the computer. The interface circuit 4, parallel port 8, serial port 9 and interface circuit 13 correspond to the hardware on the expansion board inserted into the expansion slot of the computer. The buffers 14–16 correspond to each storage area of each main memory 5 or expansion memory (not illustrated).

Now each composing element in FIG. 1 will be described. The graphics data generation processor 3 plays the role of coprocessor of the CPU 1. In other words, the graphics data generation processor 3 performs coordinate transformation and light source calculation, such as performing a matrix operation in a fixed point format and a vector operation, by parallel processing.

The major processing executed by the graphics data generation processor 3 includes processing to determine the address data of the processing target image in a predetermined display area to the CPU 1 based on the coordinate data, moving amount data and rotation amount data of each vertex of the image data supplied from the CPU 1 in a two-dimensional or 3D space and to return the address data to the CPU 1, and processing to calculate the luminance of images according to the distance from a light source, which is set virtually.

The interface circuit 4 is used for interfacing peripheral devices, such as a pointing device, including a mouse and track ball. The main memory 5 is comprised of RAM (Random Access Memory). In the ROM 6, the program data to be the operation system of the video game machine has been stored. This program corresponds to BIOS (Basic Input Output System) of the personal computer.

The expansion circuit 7 performs expansion processing on compressed images compressed by intra-encoding conforming to the MPEG (Moving Picture Experts Group) standard for moving pictures, or JPEG (Joint Photographic Experts Group) for still pictures. The expansion processing includes decoding processing (decoding data encoded by VLC: Variable Length Code), inverse quantization processing, IDCT (Inverse Discrete Cosine Transform) processing, and intra-image recovery processing.

The drawing processor 10 performs drawing processing for the buffer 14 based on a drawing instruction which the CPU 1 issues at each predetermined time T (e.g. T=1/60 sec. in one frame).

The buffer 14 is comprised of RAM, for example, and is divided into a display area (frame buffer) and a non-display area. The display area is comprised of a development area for data to be displayed on the display screen of the television monitor 21. The non-display area is comprised of a storage area for data to define skeletons, model data to define polygons, animation data for models to move, pattern data to indicate the content of each animation, texture data, and color palette data.

Here texture data is two-dimensional image data. The color palette data is data for specifying the color of texture data. The CPU 1 records these data in the non-display area of the buffer 14 in advance from the recording medium 300 all at once, or in a plurality of times according to the progress status of the game.

The drawing instructions include drawing instructions for drawing a 3D image using polygons and drawing instructions for drawing a regular two-dimensional image. Here a polygon is a polygonal two-dimensional virtual graphic, such as a triangle and a square, for example.

Drawing instructions for drawing a 3D image using polygons are used for polygon vertex address data, which indicates the storage position of the polygon vertex coordinate data on the display area in the buffer 14, for texture address data, which indicates the storage position of the texture to be pasted onto polygons in the buffer 14, for color palette address data, which indicates the storage position of the color palette data to indicate the color of the texture in the buffer 14, and for luminance data which indicates the luminance of the texture.

Out of the above data, the polygon vertex address data on the display area is data created when the polygon vertex coordinate data in the 3D space from the CPU 1 is coordinate-transformed into the two-dimensional polygon vertex coordinate data by the graphic data generation processor 3 based on the movement amount data and rotation amount data. The luminance data is determined by the graphics data generation processor 3 based on the distance from a position indicated by the polygon vertex coordinate data after the above coordinate-transformation provided from the CPU 1 to the virtually installed light source.

The polygon vertex address data indicates an address in the display area of the buffer 14. The drawing processor 10 performs processing to write the texture data corresponding to the range of the display area of the buffer 14 indicated by three polygon vertex address data.

An object in the game space, such as a character, is comprised of a plurality of polygons. The CPU 1 associates the coordinate data of each polygon in the 3D space with the vector data of the corresponding skeletons, and stores it in the buffer 14. And when the object is moved on the display screen of the television monitor 21 by the later mentioned operation of the controller 19, the following processing is performed to express the movement of the object or the viewpoint position from which the object is viewed is changed.

To the graphics data generation processor 3, the CPU 1 provides the 3D coordinate data of the vertexes of each polygon, which is held in the non-display area of the buffer 14, and the movement amount data and the rotation amount data of each polygon determined from the coordinates of the skeleton and the rotation amount data thereof.

The graphics data generation processor 3 sequentially determines the 3D coordinate data of each polygon after movement and after rotation based on the 3D coordinate data of the vertexes of each polygon and the movement amount data and rotation amount data of each polygon.

Of the 3D coordinate data of each polygon determined like this, the coordinate data in the horizontal and vertical directions are supplied to the drawing processor 10 as address data on the display area of the buffer 14, that is, as polygon vertex address data.

The drawing processor 10 writes the texture data indicated by the texture address data which has been allocated on the display area by the buffer 14 indicated by the three polygon vertex address data. By this, an object comprised of many polygons where texture is pasted is displayed on the display screen of the television monitor 21.

A drawing instruction for drawing regular two-dimensional images is used for vertex address data, texture address data, color palette address data, which indicates the storage position of the color palette data to indicate the color of the texture data in the buffer 14, and luminance data, which indicates the luminance of the texture. Of these data, the vertex address data is obtained by the graphics data generation processor 3, which coordinate-transforms the vertex coordinate data on the two-dimensional plane from the CPU 1 based on the movement amount data and the rotation amount data from the CPU 1.

The voice processor 11 stores the ADPCM (Adaptive Differential Pulse Code Modulation) data, which is read from the recording medium 300, in the buffer 15, and the ADPCM data stored in the buffer 15 becomes the sound source.

The voice processor 11 reads the ADPCM data from the buffer 15 based on the clock signal at a 44.1 kHz frequency. The voice processor 11 performs such processing as converting pitch for the read ADPCM data, adding noise, setting an envelope, setting level, and adding reverberation.

When the voice data read from the recording medium 300 is PCM (Pulse Code Modulation) data, such as CD-DA (Compact Disk Digital Audio), the voice processor 11 converts this voice data into ADPCM data. The processing of PCM data by a program is directly executed on the main memory 5. The PCM data processed on the main memory 5 is supplied to the voice processor 11, and is converted into ADPCM data. Then various processings mentioned above are executed, and voice is output from the speaker 23.

For the recording medium drive 17, a DVD-ROM drive, CD-ROM drive, hard disk drive, optical disk drive, flexible disk drive, silicon disk drive, and cassette medium reader, for example, are used. In this case, a DVD-ROM, CD-ROM, hard disk, optical disk, flexible disk and semiconductor memory, for example, are used for the recording medium 300.

The recording medium drive 17 reads image data, voice data and program data from the recording medium 300, and supplies the read data to the decoder 12. The decoder 12 performs error correction processing with ECC (Error Correction Code) on the data regenerated from the recording medium drive 17, and supplies error corrected data to the main memory 5 or to the voice processor 11.

For the memory 18, a card type memory, for example, is used. The card type memory is used for holding various game parameters at the point of interruption, for example, such as the case of holding status at the point of interruption when a game is interrupted.

The controller 19 is an operation device used for the player to input various operation instructions, and sends an operation signal according to the operation by the player to the CPU 1. On the controller 19, a first button 19a, second button 19b, third button 19c, fourth button 19d, up key 19U, down key 19D, left key 19L, right key 19R, L1 button 19L1, L2 button 19L2, R1 button 19R1, R2 button 19R2, start button 19e, select button 19f, left stick 19SL and right stick 19SR are installed.

The up key 19U, down key 19D, left key 19L and right key 19R are used for sending commands, to move the object and the cursor vertically and horizontally on the screen of the television monitor 21, for example, to the CPU 1.

The start button 19e is used, for example, for instructing the CPU 1 to load the game program from the recording medium 300. The select button 19f is used, for example, for instructing the CPU 1 to make various selections on the game program which is loading from the recording medium 300 to the main memory 5.

Each button and each key of the controller 19, except the left stick 19SL and the right stick 19SR, is a switch which turns ON if pressed down from the neutral position by an external pressing force, and turns OFF if the pressing force is released, and the button or key returns to the neutral position.

The left stick 19SL and the right stick 19SR are stick type controllers which configuration is roughly the same as a joy stick. This stick type controller has an upright stick, and can tilt 360°, including to the front, back, left and right, with a predetermined position of the stick as a fulcrum. The left stick 19SL and the right stick 19SR sends the values of the x coordinate, which is the left and right directions, and the value of the y coordinate in the front and back directions, with the upright position as an origin, to the CPU 1 via the interface circuit 13 as operation signals.

The first button 19a, second button 19b, third button 19c, fourth button 19d, L1 button 19L1, L2 button 19L2, R1 button 19R1 and R2 button 19R2 are used for various functions according to the game program loaded from the recording medium 300.

Now the general operation of the above mentioned video game machine will be described. When the recording medium 300 is set in the recording medium drive 17, if the power switch (not illustrated) is turned ON and power is supplied to the video game machine, the CPU 1 instructs the recording medium drive 17 to read the game program from the recording medium 300 based on the operating system stored in the ROM 6. By this, the recording medium drive 17 reads image data, voice data and program data from the recording medium 300. The read image data, voice data and program data are supplied to the decoder 12, and error correction processing is performed for each data by the decoder 12.

The image data for which error correction processing was performed by the decoder 12 is supplied to the expansion circuit 7 via the bus line 2. The image data for which the expansion processing is performed by the expansion circuit 7 is supplied to the drawing processor 10, and is written to the non-display area of the buffer 14 by the drawing processor 10. The voice data for which error correction processing was performed by the decoder 12 is written to the buffer 15 via the main memory 5 or the voice processor 11. The program data for which error correction processing was performed by the decoder 12 is written to the main memory 5.

Hereafter, the CPU 1 progresses the video game based on the game program stored in the main memory 5 and on the content which the player instructs using the controller 19. In other words, based on the content which the player instructs using the controller 19, the CPU 1 executes such control as image processing control, voice processing control, and internal processing control.

As image processing control, the calculation of the coordinates of each skeleton from pattern data corresponding to the animation instructed for the objects, the calculation of vertex coordinate data of polygons, the supply of obtained 3D coordinate data and viewpoint position data to the graphics data generation processor 3, and the issue of drawing instructions, including address data and luminance data on the display area of the buffer 14 determined by the graphics data generation processor 3, are performed, for example.

As voice processing control, the issue of voice output commands to the voice processor 11 and the specification of level and reverberation are performed, for example. As internal processing control, computation according to the operation of the controller 19 is performed, for example.

Figure 2:
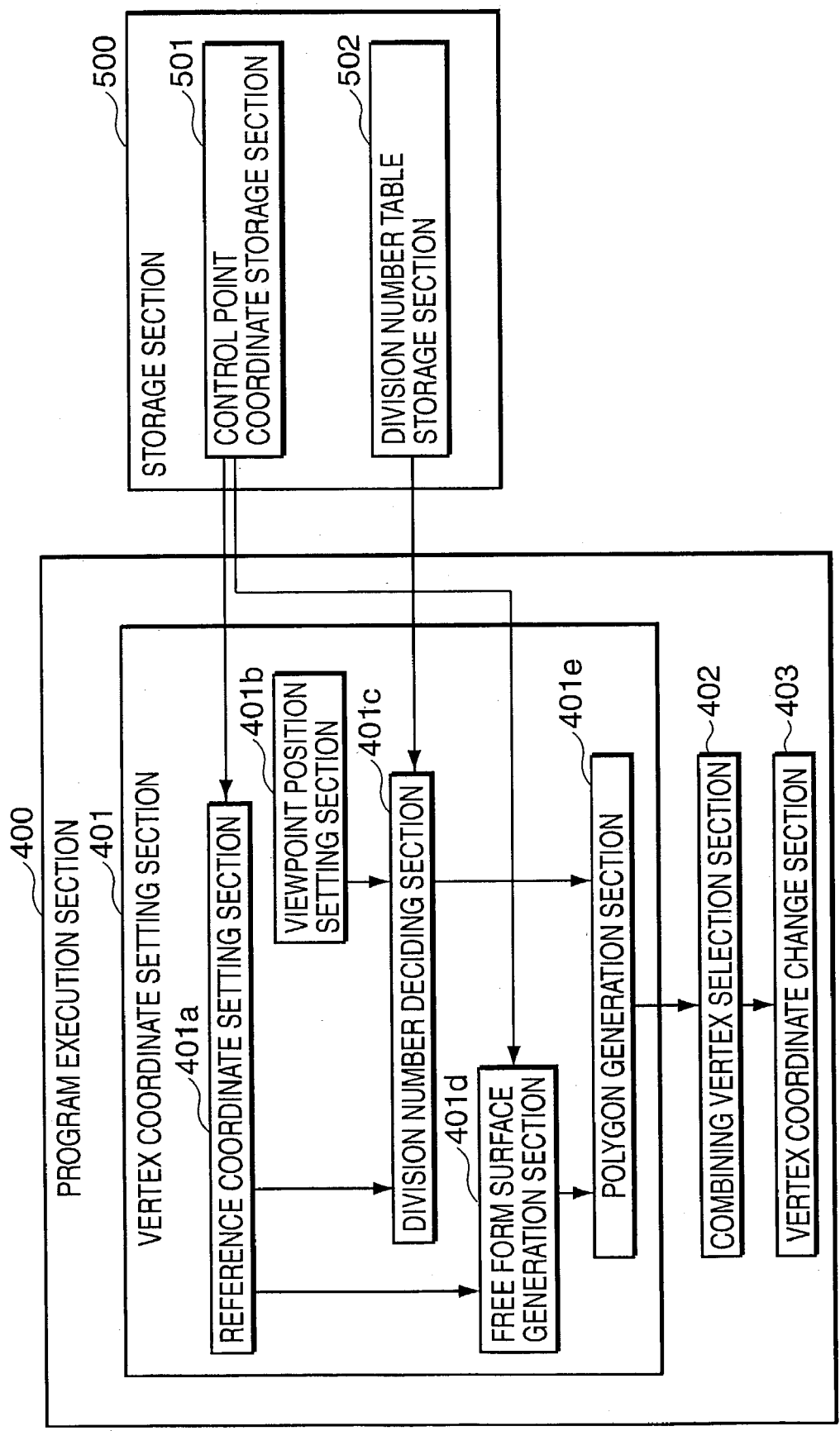
FIG. 2 is a functional block diagram depicting the major sections of the 3D image processor of the present invention.

FIG. 2 is a functional block diagram depicting the major sections of the 3D image processor of the present invention. The 3D image processing program of the present invention is recorded in the recording medium 300 shown in FIG. 1, just like the above mentioned game program, and is loaded onto the main memory 5, and while receiving operations which the player performs via the controller 19, the CPU 1 sequentially executes the 3D image processing program on the main memory 5, so as to implement the respective functions. The 3D image processor is comprised of a program execution section 400, which implements various functions by executing various processing programs, and a storage section 500 for storing data.

The program execution section 400 is comprised of a vertex coordinate setting section 401 (corresponding to the vertex coordinate setting means) for setting the vertex coordinates of each polygon constituting the first and second patches, a combining vertex selection section 402 (corresponding to the combining vertex selection means) for selecting the vertexes of the combining target polygons from the first and second patches respectively, and a vertex coordinate change section 403 (corresponding to the vertex coordinate change means) for matching the vertex coordinates of the first patch side and the vertex coordinates of the second patch side for the vertex coordinates of the selected polygons.

The storage section 500 is comprised of a control point coordinate storage section 501 for storing the coordinate data of control points which define the free form surface of the first and second patches respectively, and a division number table storage section 502 for storing a lookup table whereby the division number is uniquely determined depending on the distance between the reference points of the first and second patches and the virtual viewpoint in the virtual 3D space (this table is referred to as the division number table). How the free form surface is defined by control points is described later.

FIG. 3 is a table indicating an example of the division number table. When the distance SL between the reference points of the first and second patches and the virtual viewpoint in the virtual 3D space is 1000 meters or less, the division number DN is 10, and as the distance SL increases the division number DN decreases, the division number DN is 4 if the distance SL exceeds 3000 meters. As the distance SL increases, the division number DN decreases, and the number of polygons constituting the patch decreases in proportion to the square of the division number DN as mentioned later, so the deterioration of image quality is prevented, and processing speed is improved.

The vertex coordinate setting section 401 is comprised of a reference coordinate setting section 401a (corresponding to the reference coordinate setting means) for determining the coordinates of the reference points of the first and second patches from the coordinates of the control points stored in the control point coordinate storage section 501, a viewpoint position setting section 401b (corresponding to the viewpoint position setting means) for setting the position of the virtual viewpoint, a division number deciding section 401c (corresponding to the division number deciding means) for determining the division number DN using the division number table stored in the division number table storage section 502 from the distance between the reference points and the virtual viewpoint, a free form surface generation section 401d (corresponding to the free form surface generation means) for generating a free form surface using the control points having coordinate data stored in the control point coordinate storage section 501 for defining the first and second patches respectively, and a polygon generation section 401e (corresponding to the polygon generation means) for generating the vertex coordinates of each polygon constituting the first and second patches by dividing the free form surface, which is generated by the free form surface generation section 401d using the division number DN determined by the division number deciding section 401c.

The reference coordinate setting section 401a is for determining the coordinates of the center position of a rectangular parallelepiped having edges in the three axis directions of a virtual 3D space where all the control points constituting the patch are included (called a bounding box)

which has the smallest volume in the virtual 3D space, as the coordinates of the reference points of the first and second patches.

The viewpoint position setting section 401*b* is for receiving input by the player from the controller 19, and for setting the virtual viewpoint position to an appropriate position (e.g. position where the main character, which is the target character operated by the player, is displayed at the center of the field of view) according to the progress of the game.

The division number deciding section 401*c* is for determining the division number DN using the division number table stored in the division number table storage section 502 based on the distance SL between the reference point and the virtual viewpoint. By using the division number table shown in FIG. 3, the division number DN decreases and the number of polygons constituting the patch decreases as the distance SL between the reference point and the virtual viewpoint increases, so a drop in image quality is prevented, and processing speed improves.

The free form surface generation section 401*d* is for generating the free form surface by a parametric function using control points having coordinate data stored in the control point coordinate storage section 501 so as to define the first and second patches respectively. For the parametric function, the case of using a Bezier function will be described here. The free form surface obtained by using a Bezier function is called a "Bezier surface".

If the coordinate of the control point $P_{i,j}$ (where i=0, 1, . . . M, j=0, 1, . . . N) is $P_{i,j}(x_{i,j}, y_{i,j}, z_{i,j})$, then the free form surface S (u, v) is given by the following formula, that is, a product of the polynomial $B_{mi}(u)$ and $B_{nj}(v)$ of the two parameters u and v (where 0=u=1, 0=v=1) and the coordinate $P_{i,j}(x_{i,j}, y_{i,j}, z_{i,j})$ of the control point $P_{i,j}$.

[Formula]

$$S(u, v) = \sum_{i=0}^{m} \sum_{j=0}^{n} P_{i+1,j+1} \cdot B_{mi}(u) \cdot B_{nj}(v) \quad (1\text{-}1)$$

where $$B_{mi}(u) = \frac{m!}{i!(m-i)!} \cdot u^i \cdot (1-u)^{m-i} \quad (1\text{-}2)$$

$$B_{nj}(v) = \frac{n!}{j!(n-j)!} \cdot u^j \cdot (1-u)^{n-j} \quad (1\text{-}3)$$

Figure 4:
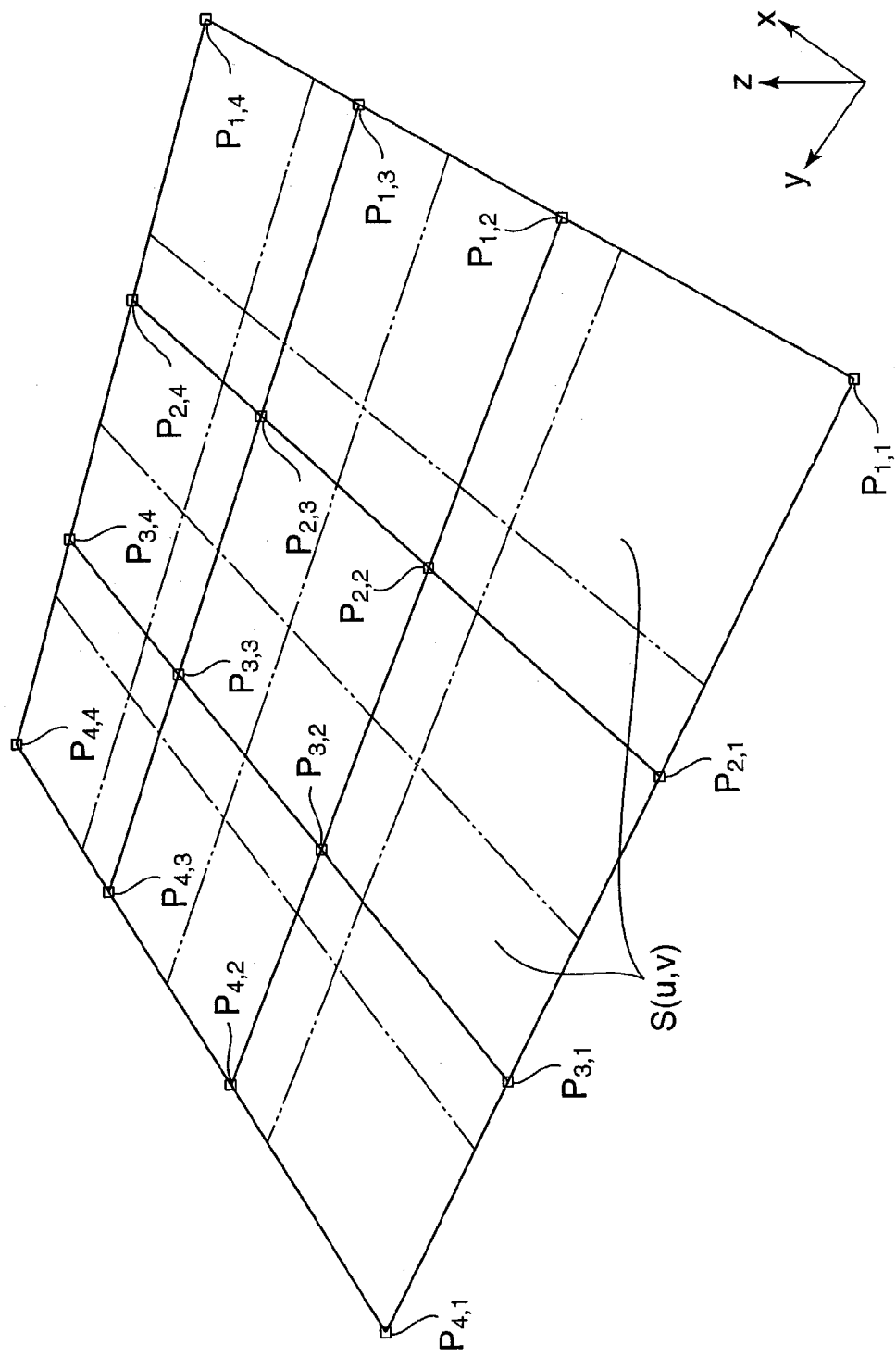
FIG. 4 is a diagram depicting the relationship between the positions of the control points and the shape of a free form surface.
Figure 5:
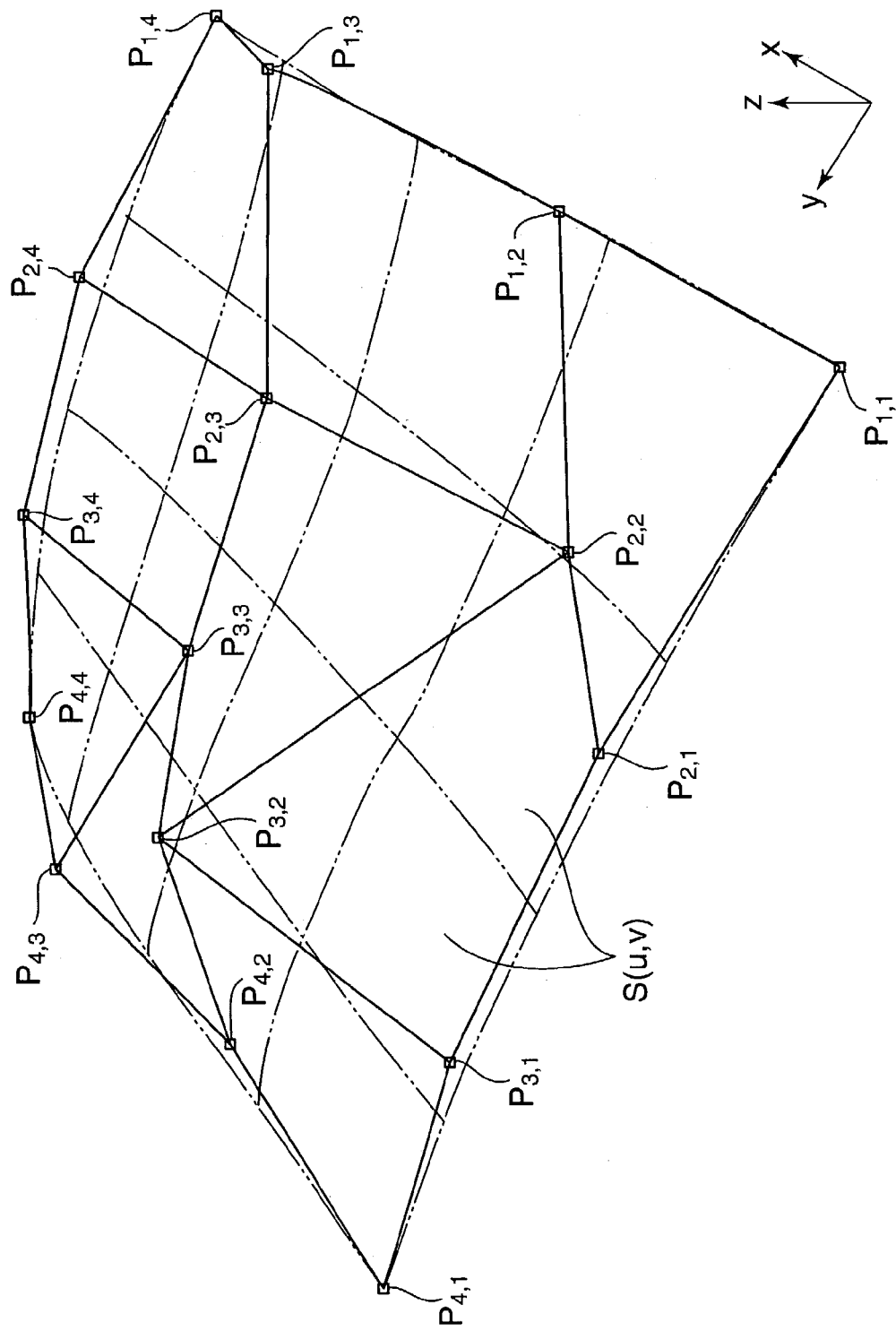
FIG. 5 is a diagram depicting the relationship between the positions of the control points and the shape of a free form surface.

The state of the change of the free form surface S (u, v) along with the change of the coordinate $P_{i,j}(x_{i,j}, y_{i,j}, z_{i,j})$ of the control point $P_{i,j}$ will be described with reference to FIG. 4 and FIG. 5. In FIG. 4 and FIG. 5, the number of control points is 16(M=4, N=4), and the coordinate axis is shown at the lower right of FIG. 4 and FIG. 5. FIG. 4 is the case when the control points $P_{i,j}$ are on a same plane, and FIG. 5 is the case when the control points $P_{i,j}$ are not on a same plane. When the control points $P_{i,j}$ are on a same plane as shown in FIG. 4, the free form surface S (u, v) is a plane which passes through all the control points $P_{i,j}$.

When the control points $P_{i,j}$ are not on a same plane as shown in FIG. 5, the end points (points located at the four corners) of the free form surface S (u, v) match the positions of the control points $P_{i,j}$, and the free form surface forms a 3D surface which is determined by the coordinate $P_{i,j}(x_{i,j}, y_{i,j}, z_{i,j})$ of the control points $P_{i,j}$. For example, the control point $P_{2,2}$ dislocates in the negative direction of the z axis, so the free form surface S (u, v) also dislocates in the negative direction of the z axis, and the control point $P_{2,3}$ dislocates in the positive direction of the z axis, so the free form surface S (u, v) also dislocates in the positive direction of the z axis. In this way, the desired shape of the free form surface S (u, v) can be formed by changing the coordinate $P_{i,j}(x_{i,j}, y_{i,j}, z_{i,j})$ of the control point $P_{i,j}$. Also a more complicated shape of the free form surface S (u, v) can be created by increasing the number of control points $P_{i,j}$ (at least one of M and N).

The polygon generation section 401*e* is for dividing the free form surface S (u, v) generated by the free form surface generation section 401*d* using the division number determined by the division number deciding section 401*c* so as to generate the vertex coordinates of each polygon constituting the first and second patches. Specifically, the vertex coordinates of the polygon are generated by setting the parameter values u and v of the free form surface S (u, v) according to the division number DN. For example, if the division number DN is 5, 36 vertex coordinates, which are obtained by substituting a combination of u (=0, 0.2, 0.4, 0.6, 0.8, 1.0) and v (=0, 0.2, 0.4, 0.6, 0.8, 1.0) for the formula (1-1), become the vertex coordinates of the polygon. If a square polygon is used, then the vertex coordinates of 25 (=5×5) polygons are set, and if a triangle polygon is used, the vertex coordinates of 50 (=5×5×2) polygons are set. In other words, the number of polygons is in proportion to the square of the division number DN.

Figure 12:
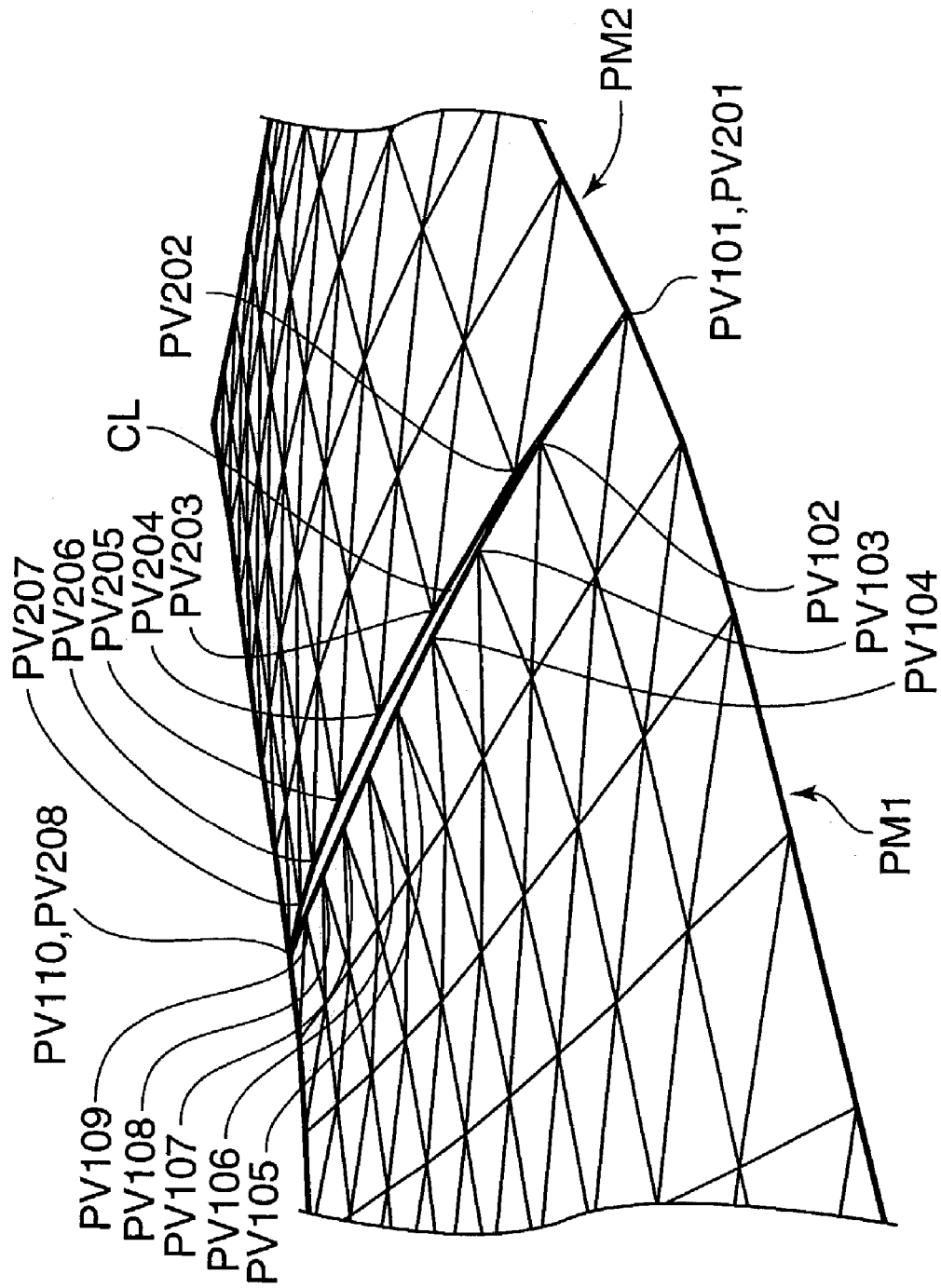
FIG. 12 is a diagram depicting an example of the clearance generated when two patches with a different number of polygons (number of vertexes of polygons) are combined.

The combining vertex selection section 402 is for selecting the vertexes of the combining target polygons from the first and second patches respectively. For example, when the patch PM1 at the left and the patch PM2 at the right, shown in FIG. 12, are combined, the vertexes PV101–PV110 are selected as the vertexes of the combining target polygons from the patch PM1, and the vertexes PV201–PV208 are selected as the vertexes of the combining target polygons from the patch PM2.

The vertex coordinate change section 403 is for matching the vertex coordinates of the combining target polygons in the first patch with the vertex coordinates of the combining target polygons in the second patch when the number of vertexes of the combining target polygons in the first patch is more than the number of vertexes of the combining target polygons in the second patch. For example, when the patch PM1 at the left and the patch PM2 at the right, shown in FIG. 12, are combined, the coordinates of the vertexes PV101–PV110 of the patch PM1 are matched with the coordinates of the vertexes PV201–PV208 of the patch PM2.

Figure 6:
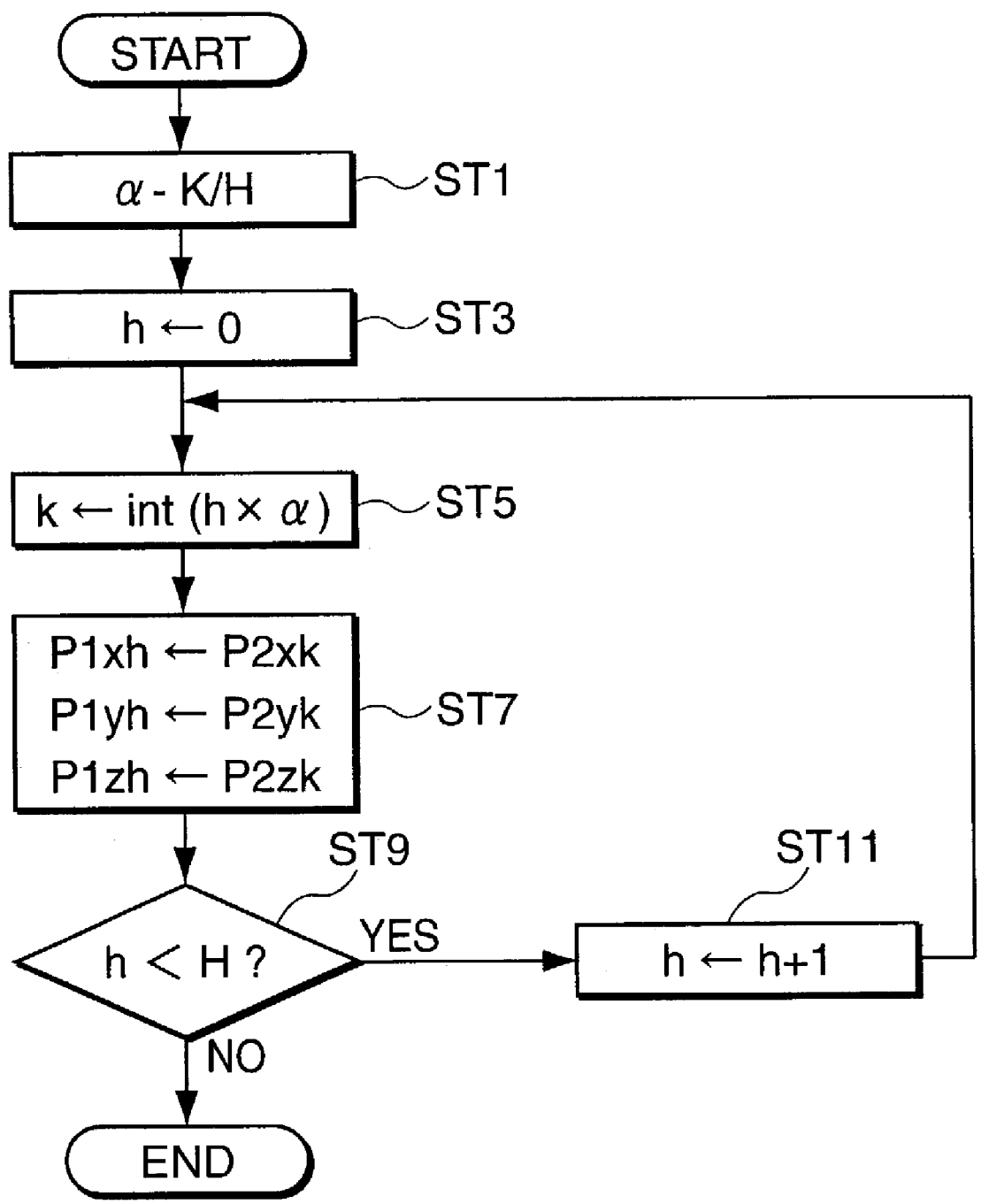
FIG. 6 is a flow chart depicting an example of vertex coordinate change processing.

FIG. 6 is a flow chart depicting an example of the vertex coordinate change processing performed by the vertex coordinate change section 403. Here the case when the vertexes P1*i* (i=0, 1, . . . H) of the polygons constituting the first patch and the vertexes P2*j* (j=0, 1, . . . K) constituting the second patch are combined will be described. Here it is assumed that the number of vertexes H of the combining target polygons in the first patch is more than the number of vertexes K of the combining target polygons in the second patch. The coordinates of the vertex P1*i* are (P1xi, P1yi, P1zi), and the coordinates of the vertex P2*j* are (p2xj, P2yj, P2zj).

At first, the adjustment factor α for adjusting the difference of the number of vertexes is obtained by dividing the number of vertexes K by the number of the vertexes H (step ST1). Then the counter h is initialized to 0 (step ST3). And the counter h is multiplied by the adjustment factor α and the integer part of the result is set to the counter k (step ST5). Then the coordinates of the vertex P2*k* are changed to the coordinates of the vertex P1$h$ (step ST7). And it is judged whether the counter h is less than the number of vertexes H (step ST9). If the result of this judgment is "Yes", then the counter h is incremented (step ST11), and processing returns to step ST5. And if the result of this judgment is "Yes", processing ends.

Figure 7:
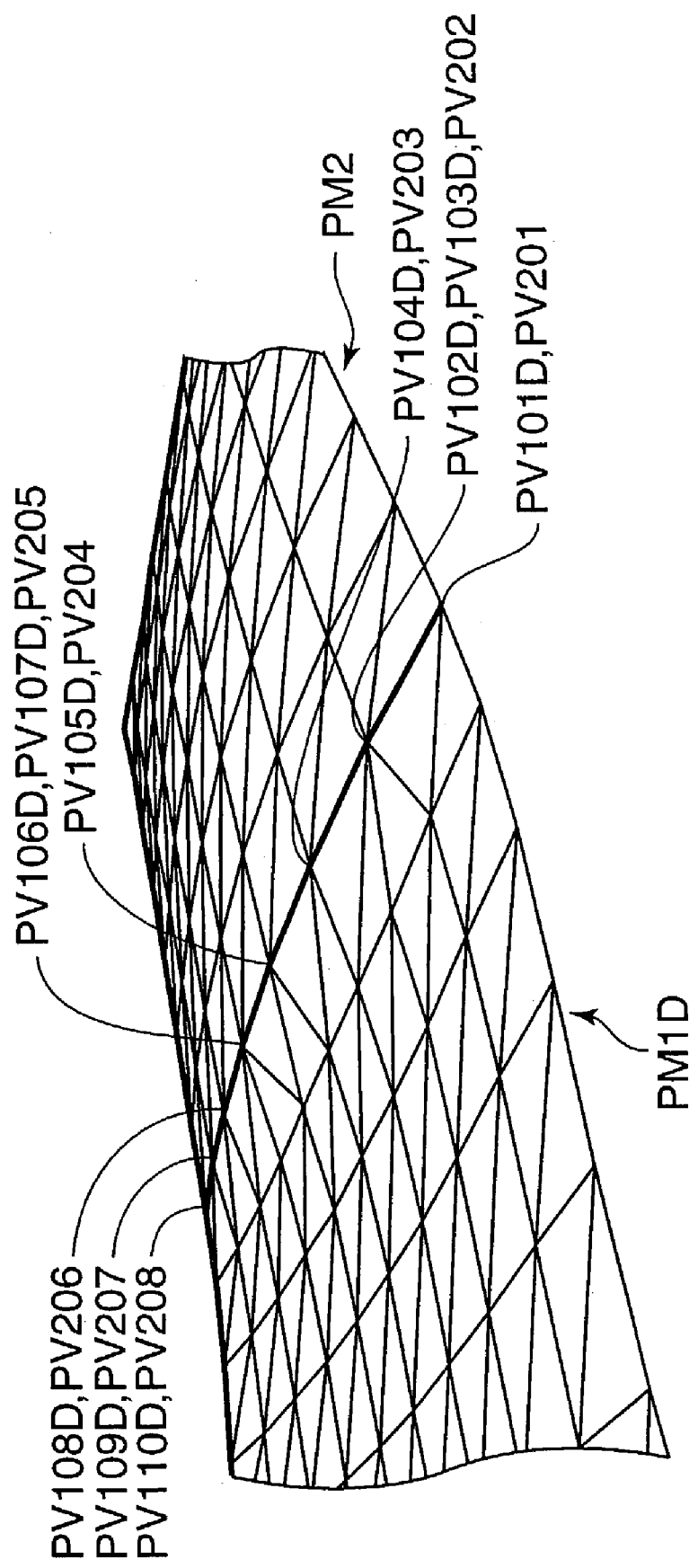
FIG. 7 is a diagram depicting an example of the result when the vertex coordinate change processing shown in FIG. 6 is performed to combine two patches.

FIG. 7 is a diagram depicting an example of the result when the vertex coordinate change processing, shown in FIG. 6, was performed to combine two patches with a different number of polygons (number of vertexes of polygons), shown in FIG. 12. In FIG. 7, when the patch PM1 at the left and the patch PM2 at the right are combined, there are ten combining target vertexes, PV101–PV110, in the patch PM1, and there are eight combining target vertexes, PV201–PV208, in the patch PM2, so in the vertex coordinate change processing to be executed by the vertex coordinate change section 403, the coordinates of the combining target vertexes PV101–PV110 in the patch PM1 in FIG. 12 are changed so as to match with the combining target vertexes PV201–PV208 in the patch PM2. In other words, for the combining target vertexes, PV101–PV110, in the patch PM1 in FIG. 12, the vertex coordinates thereof are changed so that the positions of the vertexes come to the positions of the vertexes PV101D–PV110D in FIG. 7. As a result, the patch PM1 and the patch PM2 are combined while preventing the generation of clearance.

Figure 8:
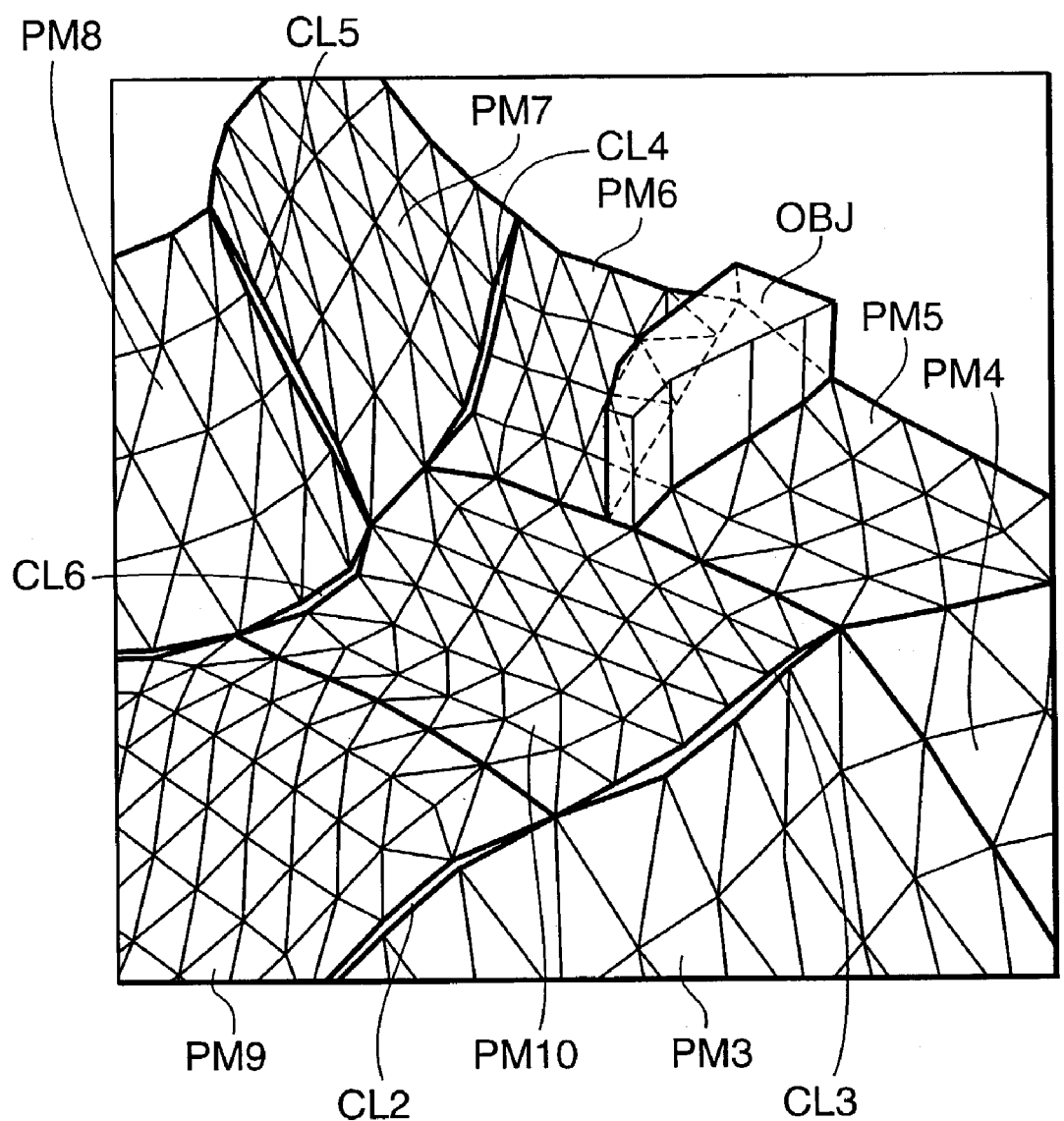
FIG. 8 is a diagram depicting an example of the clearance generated when eight patches and one object are combined.

FIG. 8 is a diagram depicting an example of the clearances which are generated when eight patches and one object are combined. In FIG. 8, as a result of combining the patches PM3–PM10 and the object OBJ, the clearances CL2–CL6 are generated at the combining sections where the division number is different between the patches (or patch and object) to be combined.

Figure 9:
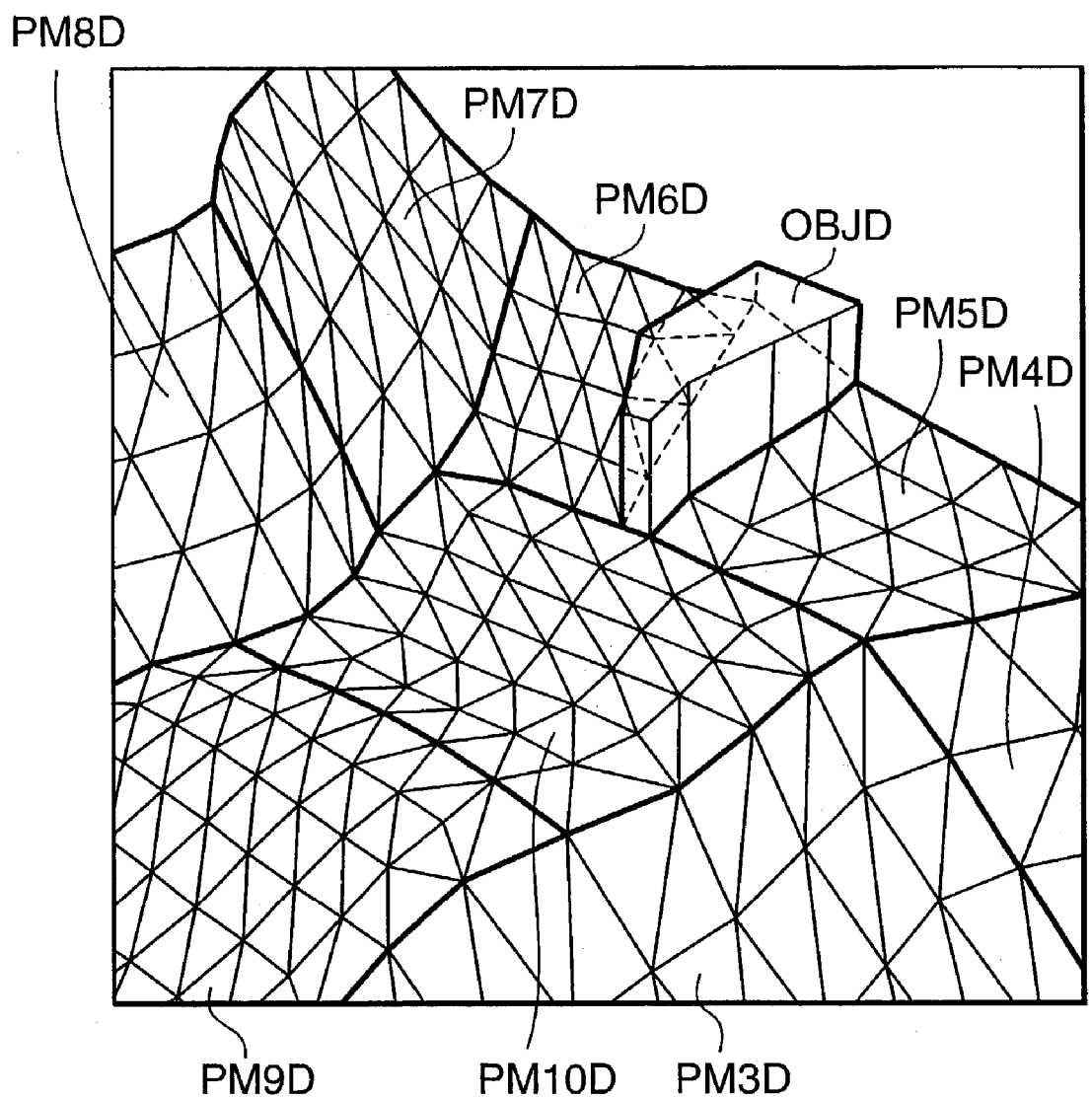
FIG. 9 is a diagram depicting an example of the result when the image processing of the present invention is performed to combine the eight patches and one object shown in FIG. 8.

FIG. 9 is a diagram depicting an example of the result when the image processing of the present invention is performed to combine the eight patches and one object shown in FIG. 8. In FIG. 9, for the patch (or object) which has a higher number of combining target vertexes, the vertex coordinates thereof are changed so that the positions of the vertexes come to the positions of the vertexes of the patch (or object) which has a lower number of combining target vertexes. For example, for the edge at the upper left of the patch PM3, the number of vertexes to be combined with the patch PM10 is 5, and for the edge at the lower right of the patch PM10, the number of vertexes to be combined with the patch PM3 is 7, so the vertex coordinates are changed so that the positions of the vertexes for the edge at the lower right of the patch PM10 to be combined with the patch PM3 match with the positions of the vertexes for the edge at the upper left of the patch PM3 to be combined with the patch PM10. As a result, the patches or the patch and the objects are combined while preventing the generation of clearances.

Figure 10:
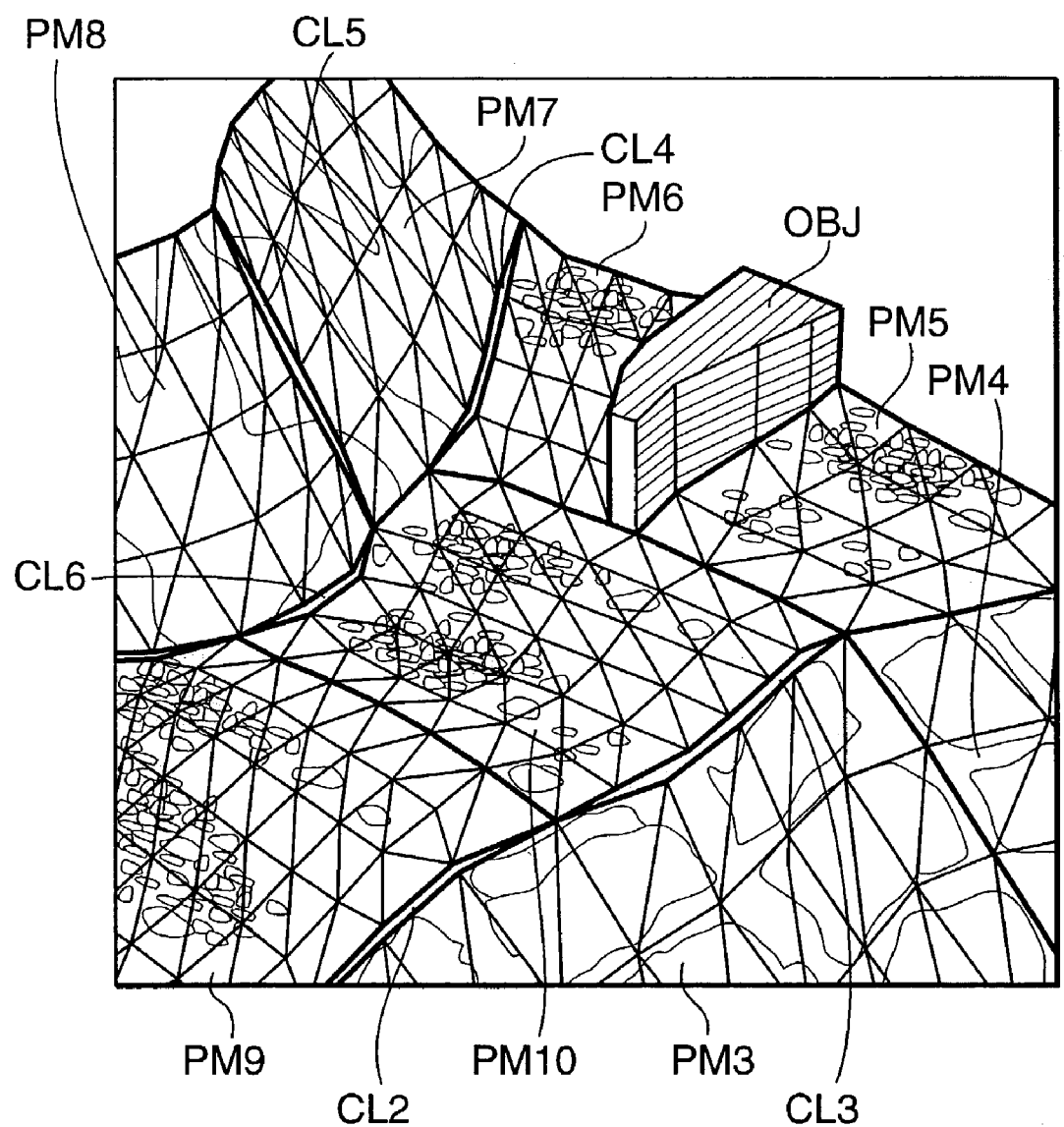
FIG. 10 is a diagram depicting an example of a screen which is created by pasting texture on the polygons constituting the patches and object shown in FIG. 8.

FIG. 10 is a diagram depicting an example of a screen which is formed by pasting texture on the polygons constituting the patch and object shown in FIG. 8. Since clearances are generated at the section combining patches (or patch and object) having a different division number, image quality and reality thereof drop.

Figure 11:
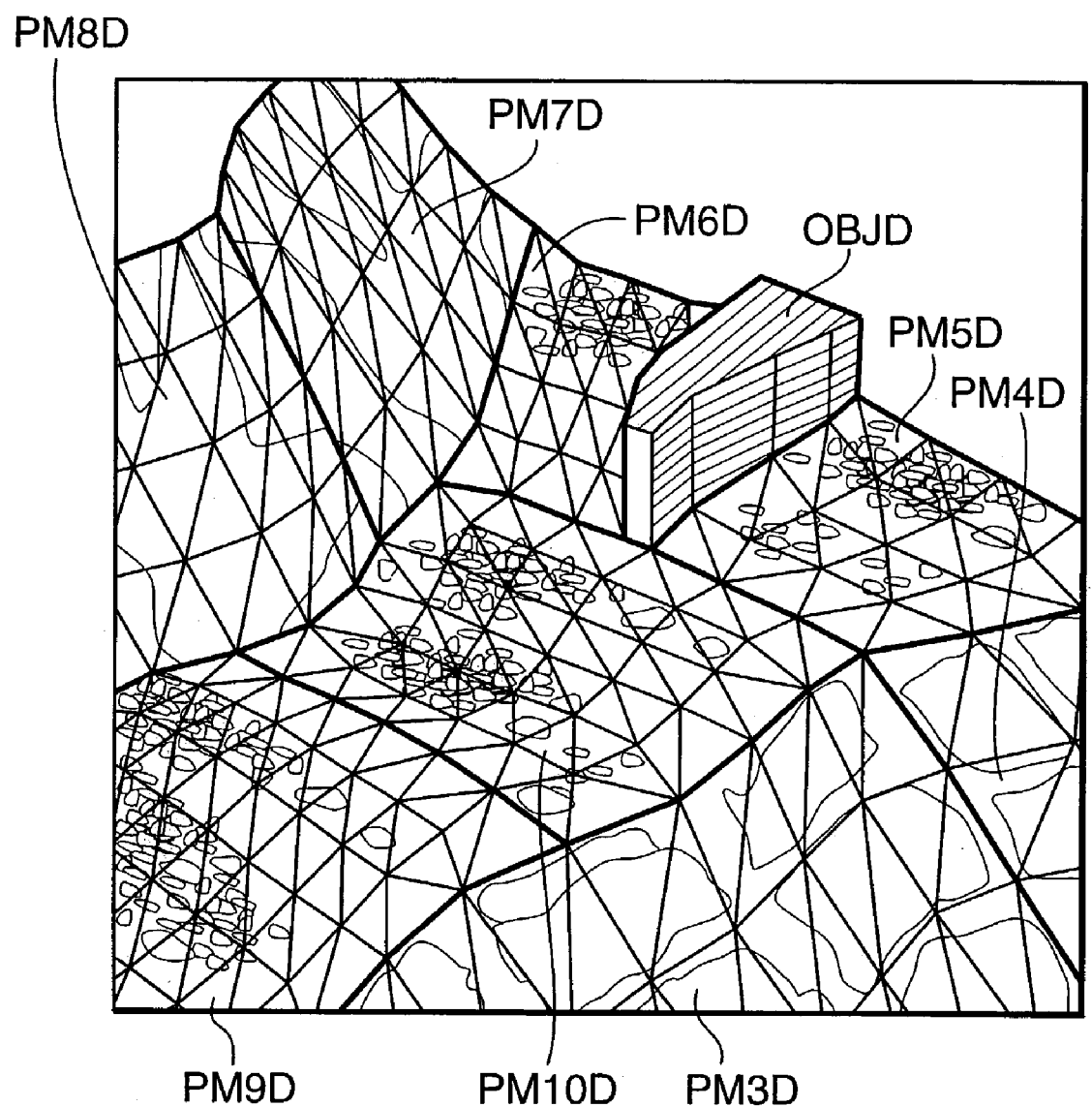
FIG. 11 is a diagram depicting an example of a screen which is created by pasting texture on the polygons constituting the patches and object shown in FIG. 9.

FIG. 11 is a diagram depicting an example of a screen which is formed by pasting texture on the polygons constituting the patch and object shown in FIG. 9. Since the patches or patch and object are combined while preventing the generation of clearances, image quality and reality thereof are improved.

The present invention may have the following aspects.

(A) In the present embodiment, the case when the vertex coordinates of polygons constituting the patch are generated by the polygon generation section was described, but the vertex coordinates may be stored in such a storage means as ROM or CD-ROM of the computer, and be read from the storage means. In this case, the load on the CPU is decreased.

(B) In the present embodiment, the case when the reference point of the free form surface to be used for determining the division number of the free form surface is the center point of the bounding box was described, but another point, such as one of the control points for forming the free form surface, may be used.

(C) In the present embodiment, the case when the free form surface is generated by a Bezier function was described, but another function, such as a Spline function, NURBS (Non-Uniform Rational B-Spline) function, and a Sub Division Surface function, may be used.

(D) In the present embodiment, the case when the division number of the free form surface is determined using a lookup table was described, but the division number may be determined using a predetermined computing equation (E) In the present embodiment, the case when two patches are combined was described, but two objects or an object and a patch may be combined.

(F) In the present embodiment, the case when the vertex coordinates of the combining target vertexes are changed was described, but at least another vertex information, such as the vertex color, vertex texture coordinates, and vertex normal vectors, may be changed, in addition to the vertex coordinates. However, if two patches, two objects, or a patch and an object to be combined have mutually different material information (e.g. ambient color, diffuse color, specular color, texture information), it is preferable not to change the vertex texture coordinates, since more natural images can be created.

In summary, this invention relates to a recording medium which stores a 3D image processing program for combining a first and second patches which are comprised of a plurality of polygons respectively. The 3D image processing program stored in the recording medium causes a computer to function as vertex coordinate setting means for setting the vertex coordinates of each polygon constituting the first and second patches, combining vertex selection means for selecting the vertexes of combining target polygons from the first and second patches respectively, and vertex coordinate change means for matching the vertex coordinates of the first patch side and the vertex coordinates of the second patch side for the vertex coordinates of the selected polygons.

According to the above invention, the vertex coordinate setting means sets the vertex coordinates of each polygon constituting the first and second patches, the combining vertex selection means selects the vertexes of the combining target polygons from the first and second patches respectively, and the vertex coordinate change means changes the vertex coordinates so that the vertex coordinates of the first patch side and the vertex coordinates of the second path side match for the vertex coordinates of the selected polygons. By matching the vertex coordinates of the combined target polygons of the first and second patches, the clearance between the first and second patches is combined as if it seamed, and the image quality of the images created by combining the first and second patches and the reality thereof are improved.

In the aforementioned 3D image processing program, it is preferable that when the number of vertexes of the combining target polygons in the first patch is more than the number of vertexes of the combining target polygons in the second patch, the vertex coordinate change means matches the vertex coordinates of the combining target polygons in the first patch with the vertex coordinates of the combining target polygons in the second patch.

According to the above invention with the aforementioned feature, when the number of vertexes of the combining target polygons in the first patch is more than the number of vertexes of the combining target polygons in the second patch, the vertex coordinates are changed by the vertex coordinate change means so that the vertex coordinates of the combining target polygons in the first patch match with the vertex coordinates of the combining target polygons in the second patch. In other words, the vertex coordinates of the combining target polygons in the patch which has a higher number of vertexes match with the vertex coordinates of the combined target polygons in the patch which has a less number of vertexes, so the patches can be easily combined without increasing the number of vertexes (increasing the number of polygons).

In the aforementioned 3D image processing program, wherein the vertex coordinate setting means preferably include free form surface generation means for generating a free form surface using control points having coordinate information which has been prepared for defining the first and second patches, and polygon generation means for generating the vertex coordinates of each polygon constituting the first and second patches by dividing the generated free form surface by a predetermined division number for dividing the free form surface.

According to the invention as described above, the free form surface generation means generates a free form surface using control points having coordinate information which has been prepared to define the first and second patches respectively, and the polygon generation means divides the generated free form surface using a predetermined division number for dividing the free form surface, and generates the vertex coordinates of each polygon constituting the first and second patches. Therefore the computer stores the coordinate information on the control points, which is less than the vertex coordinates of the polygons, so the required storage capacity is decreased compared with the case when the vertex coordinates of each polygon constituting the first and second patches are stored in advance.

Moreover, in the 3D image processing program, the vertex coordinate setting means includes viewpoint position setting means for setting the position of a virtual viewpoint, and division number deciding means for determining the division number using the virtual viewpoint position information, and the polygon generation means generates the vertex coordinates of polygons using the determined division number.

According to the invention with the above features, the viewpoint position setting means sets the position of the virtual viewpoint, and the division number deciding means determines the division number using the virtual viewpoint position information. And the polygon generation means generates the vertex coordinates of the polygons using the determined division number. By decreasing the division number as the patch becomes further away from the position of the virtual viewpoint, the drop in image quality is controlled, and the processing speed can be improved.

Furthermore, in the 3D image processing program, wherein the vertex coordinate setting means preferably includes reference coordinate setting means for setting the respective coordinates of the reference points of the first and second patches, and the division number deciding means determines the division number based on the distance between the reference point and the virtual viewpoint.

According to the invention with the above features, the reference coordinate setting means sets the respective coordinates of the reference points of the first and second patches, and the division number deciding means determines the division number based on the distance between the reference point and the virtual viewpoint, so an appropriate division number is easily determined.

Furthermore, in the 3D image processing program, wherein the division number deciding means determines the division number using a lookup table whereby the division number is uniquely determined depending on the distance between the reference point and the virtual viewpoint.

According to the invention with the above features, the division number is uniquely determined from the distance between the reference point and the virtual viewpoint via the lookup table, so an appropriate division number can be determined even more easily.

Yet moreover, in the 3D image processing program, wherein the division number deciding means determines the division number by a predetermined computing equation using the distance between the reference point and the virtual viewpoint.

According to the invention with the above features, the division number is determined from the distance between the reference point and the virtual viewpoint by a computing equation, so an even more appropriate division number can be determined.

The present invention also relates to a recording medium which stores a 3D image processing program for combining a first and second objects which are comprised of a plurality of polygons respectively, the 3D image processing program causes a computer to function as vertex coordinate setting means for setting the vertex coordinates of each polygon constituting the first and second objects, combining vertex selection means for selecting the vertexes of the combining target polygons from the first and second objects respectively, and vertex coordinate change means for matching the vertex coordinates of the first object side and the vertex coordinates of the second object side for the vertex coordinates of the selected polygons.

According to the aforementioned form of the invention, the vertex coordinate setting means sets the vertex coordinates of each polygon constituting the first and second objects, the combining vertex selection means selects the vertexes of the combining target polygons from the first and second patches respectively, and the vertex coordinate change means changes the vertex coordinates so that the vertex coordinates of the first object side and the vertex coordinates of the second object side match for the vertex coordinates of the selected polygon. By matching the vertex coordinates of the combining target polygons of the first and second objects, the clearance between the first and second objects is combined as if seamed, and the image quality of the images created by combining the first and second patches and the reality thereof are improved.

With the above described form of the invention, the 3D image processing program stored in the recording medium for combining an object and a patch which are comprised of a plurality of polygons respectively, which makes a computer function as vertex coordinate setting means for setting the vertex coordinates of each polygon constituting the object and patch, combining vertex selection means for selecting the vertexes of the combining target polygons from the object and patch respectively, and vertex coordinate change means for matching the vertex coordinates of the object side and the vertex coordinates of the patch side for the vertex coordinates of the selected polygons.

According to the above invention, the vertex coordinate setting means sets the vertex coordinates of each polygon constituting the object and patch, the combining vertex selection means selects the vertexes of the combining target polygons from the object and patch respectively, and the vertex coordinate change means changes the vertex coordinates so that the vertex coordinates of the object side and the vertex coordinates of the patch side match for the vertex coordinates of the selected polygon. By matching the vertex coordinates of the combining target polygons of the object and the patch, the clearance between the object and the patch is combined as if seamed, and the image quality of the image created by combining the first and second patches and the reality thereof are improved.

Moreover, the present invention relates to a 3D image processor for combining a first and second patches which are comprised of a plurality of polygons respectively, comprising vertex coordinate setting means for setting the vertex coordinates of each polygon constituting the first and second patches, combining vertex selection means for selecting the vertexes of the combining target polygons from the first and second patches respectively, and vertex coordinate change means for matching the vertex coordinates of the first patch side and the vertex coordinates of the second patch side for the vertex coordinates of the selected polygons.

According to the above invention, the vertex coordinate setting means sets the vertex coordinates of each polygon constituting the first and second patches, the combining vertex selection means selects the vertexes of the combining target polygons from the first and second patches respectively, and the vertex coordinate change means changes the vertex coordinates so that the vertex coordinates of the first patch side and the vertex coordinates of the second patch side match for the vertex coordinates of the selected polygons. By matching the vertex coordinates of the combining target polygons of the first and second patches, the clearance between the first and second patches is combined as if seamed, and the image quality of the images created by combining the first and second patches and the reality thereof are improved.

The present invention also relates to a 3D image processing method for combining a first and second patches which are comprised of a plurality of polygons respectively, which makes a computer execute vertex coordinate setting processing for setting the vertex coordinates of each polygon constituting the first and second patches, combining vertex selection processing for selecting the vertexes of the combining target polygons from the first and second patches respectively, and vertex coordinate change processing for matching the vertex coordinates of the first patch side and the vertex coordinates of the second patch side for the vertex coordinates of the selected polygons.

According to the above form of the invention, the vertex coordinates of each polygon constituting the first and second patches are set in the vertex coordinate setting processing, the vertexes of the combining target polygons are selected from the first and second patches respectively in the combining vertex selection processing, and the vertex coordinates are changed in the vertex coordinate change processing so that the vertex coordinates of the first patch side and the vertex coordinates of the second patch side match for the vertex coordinates of the selected polygons. By matching the vertex coordinates of the combining target polygons of the first and second patches, the clearance between the first and second patches is combined as if seamed, and the image quality of the images created by combining the first and second patches and the reality thereof are improved.

In addition, the present invention relates to a video game machine comprising operation means for receiving input from the outside, game progress control means for controlling the progress of a game based on the input from the outside, game image generation means for generating game images corresponding to the progress of the game in a virtual 3D space, and display means for displaying game images, wherein the game image generation means includes vertex coordinate setting means for setting the vertex coordinates of each polygon constituting a first and second patches, combining vertex selection means for selecting the vertexes of the combining target polygons from the first and second patches respectively, and vertex coordinate change means for matching the vertex coordinates of the first patch side and the vertex coordinates of the second patch side for the vertex coordinates of the selected polygons.

According to the above invention, the operation means receives input from the outside, the game progress control means controls the progress of the game based on the input from the outside, the game image generation means generates game images corresponding to the progress of the game in a virtual 3D space, and the display means displays game images. And when the game image generation means generates the game images corresponding to the progress of the game in the virtual 3D space, the vertex coordinate setting means sets the vertex coordinates of each polygon constituting the first and second patches, the combining vertex selection means selects the vertexes of the combining target polygons from the first and second patches respectively, and the vertex coordinate change means changes the vertex coordinates so that the vertex coordinates of the first patch side and the vertex coordinates of the second patch side match for the vertex coordinates of the selected polygons. By matching the vertex coordinates of the combining target polygons of the first and second patches, the clearance between the first and second patches is combined as if seamed, and the image quality of the images created by combining the first and second patches and the reality thereof are improved.

This application is based on Japanese patent application serial no. 2002-18925, filed in Japan Patent Office on Jan. 28, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A recording medium which stores an executable 3D image processing program for combining first and second patches which are each comprised of a plurality of polygons respectively, said 3D image processing program configuring a computer to function as:

vertex coordinate setting means for setting vertex coordinates of vertexes of each polygon constituting said first and second patches;

combining vertex selection means for selecting a first set of vertexes of the vertexes of the polygons from said first patch which form a first side and a second set of vertexes of the vertexes of the polygons of the second patch which form a second side for joining the polygons of the first and second patches wherein the first side and the second side define a gap therebetween, and the first set of vertexes includes a number vertexes equal to H and the second set of vertexes includes a number vertexes equal to K, and H is greater than K; and vertex coordinate change means for removing the gap by matching the vertex coordinates of a side of said first patch and the vertex coordinates of a side of said second patch for the vertex coordinates of the selected polygons by setting the coordinates of the vertexes of the first set of vertexes equal to the coordinates of the vertexes of the second set of vertexes wherein the number of vertexes of the first set of vertexes is reduced by setting in at least one instance the coordinates of at least two adjacent ones of said vertexes of said first set of vertexes equal to the coordinates of one of said vertexes of said second set.

2. The recording medium according to claim 1, wherein said vertex coordinate setting means including:

free form surface generation means for generating a free form surface using control points having coordinate information which has been prepared for defining said first and second patches respectively; and polygon generation means for generating the vertex coordinates of each of the polygons constituting said first and second patches by dividing the generated free form surface by a division number for dividing the free form surface.

3. The recording medium according to claim 2, wherein said vertex coordinate setting means further comprises viewpoint position setting means for setting a position of a virtual viewpoint, and division number deciding means for determining the division number using the virtual viewpoint position information, and said polygon generation means generates the vertex coordinates of the polygons using the determined division number.

4. The recording medium according to claim 3, wherein said vertex coordinate setting means includes reference coordinate setting means for setting respective coordinates of reference points of said first and second patches, and said division number deciding means determines the division number based on a distance between said reference point of a respective one of the first and second patches and said virtual viewpoint.

5. The recording medium according to claim 4, wherein said division number deciding means determines the division number using a lookup table whereby the division number is uniquely determined depending on the distance between said reference point of the respective one of the first and second patches and said virtual viewpoint.

6. The recording medium according to claim 4, wherein said division number deciding means determines the division number by a predetermined computing equation using the distance between said reference point of the respective one of the first and second patches and said virtual viewpoint.

7. A recording medium which stores an executable 3D image processing program for combining first and second objects which are each comprised of a plurality of polygons respectively, said 3D image processing program configuring a computer to function as:

vertex coordinate setting means for setting vertex coordinates of vertexes of each polygon constituting said first and second objects;

combining vertex selection means for selecting a first set of vertexes of the vertexes of the polygons from said first object which form a first side and a second set of vertexes of the vertexes of the polygons of the second object which form a second side for joining the polygons of the first and second object wherein the first side and the second side define a gap therebetween, and the first set of vertexes includes a number vertexes equal to H and the second set of vertexes includes a number vertexes equal, and H is greater than K; and vertex coordinate change means for removing the gap by matching the vertex coordinates of a side of said first object and the vertex coordinates of a side of said second object for the vertex coordinates of the selected polygons by setting the coordinates of the vertexes of the first set of vertexes equal to the coordinates of the vertexes of the second set of vertexes wherein the number of vertexes of the first set of vertexes is reduced by setting in at least one instance the coordinates of at least two adjacent ones of said vertexes of said first set of vertexes equal to the coordinates of one of said vertexes of said second set.

8. A recording medium which stores an executable 3D image processing program for combining a patch and an object which are each comprised of a plurality of polygons respectively, a first image area being one of the patch and the object and a second image area being another one of the patch and the object, said 3D image processing program configuring a computer to function as:

vertex coordinate setting means for setting vertex coordinates of vertexes of each polygon constituting said object and patch;

combining vertex selection means for selecting a first set of vertexes of the vertexes of the polygons from said first image area which form a first side and a second set of vertexes of the vertexes of the polygons of the second image area which form a second side for joining the polygons of the first and second image areas wherein the first side and the second side define a gap therebetween, and the first set of vertexes includes a number vertexes equal to H and the second set of vertexes includes a number vertexes equal to K, and H is greater than K; and vertex coordinate change means for removing the gap by matching the vertex coordinates of a side of said first image area and the vertex coordinates of a side of said second image area for the vertex coordinates of the selected polygons by setting the coordinates of the vertexes of the first set of vertexes equal to the coordinates of the vertexes of the second set of vertexes wherein the number of vertexes of the first set of vertexes is reduced by setting in at least one instance the coordinates of at least two adjacent ones of said vertexes of said first set of vertexes equal to the coordinates of one of said vertexes of said second set.

9. A 3D image processing device for combining a first and second patches which are comprised of a plurality of polygons respectively, said device comprising:

vertex coordinate setting means for setting vertex coordinates of vertexes of each polygon constituting said first and second patches;

combining vertex selection means for selecting a first set of vertexes of the vertexes of the polygons from said first patch which form a first side and a second set of vertexes of the vertexes of the polygons of the second patch which form a second side for joining the polygons of the first and second patches wherein the first side and the second side define a gap therebetween, and the first set of vertexes includes a number vertexes equal to H and the second set of vertexes includes a number vertexes equal to K, and H is greater than K; and vertex coordinate change means for removing the gap by matching the vertex coordinates of a side of said first patch and the vertex coordinates of a side of said second patch for the vertex coordinates of the selected polygons by setting the coordinates of the vertexes of the first set of vertexes equal to the coordinates of the vertexes of the second set of vertexes wherein the number of vertexes of the first set of vertexes is reduced by setting in at least one instance the coordinates of at least two adjacent ones of said vertexes of said first set of vertexes equal to the coordinates of one of said vertexes of said second set.

10. A 3D image processing method for combining first and second patches which are comprised of a plurality of polygons respectively, which makes a computer execute:

vertex coordinate setting processing for setting vertex coordinates of vertexes of each polygon constituting said first and second patches;

combining vertex selection processing for selecting a first set of vertexes of the vertexes of the polygons from said first patch which form a first side and a second set of vertexes of the vertexes of the polygons of the second patch which form a second side for joining the polygons of the first and second patches wherein the first side and the second side define a gap therebetween, and the first set of vertexes includes a number vertexes equal to H and the second set of vertexes includes a number vertexes equal to K, and H is greater than K; and vertex coordinate change processing for removing the gap by matching the vertex coordinates of a side of said first patch and the vertex coordinates of a side of said second patch for the vertex coordinates of the selected polygons by setting the coordinates of the vertexes of the first set of vertexes equal to the coordinates of the vertexes of the second set of vertexes wherein the number or vertexes of the first set of vertexes is reduced by setting in at least one instance the coordinates of at least two adjacent ones of said vertexes of said first set of vertexes equal to the coordinates of one of said vertexes of said second set.

11. A video game machine for playing a game, comprising:

operation means for receiving input from a user;

game progress control means for controlling progress of the game based on the input from the user;

game image generation means for generating game images corresponding to the progress of the game in a virtual 3D space and which include areas derived from at least first and second patches; and display means for displaying game images, wherein said game image generation means includes:

vertex coordinate setting means for setting vertex coordinates of vertexes of each polygon constituting said first and second patches;

combining vertex selection means for selecting a first set of vertexes of the vertexes of the polygons from said first patch which form a first side and a second set of vertexes of the vertexes of the polygons of the second patch which form a second side for joining the polygons of the first and second patches wherein the first side and the second side define a gap therebetween, and the first set of vertexes includes a number vertexes equal to H and the second set of vertexes includes a number vertexes equal to K, and H is greater than K; and vertex coordinate change means for removing the gap by matching the vertex coordinates of a side of said first patch and the vertex coordinates of a side of said second patch for the vertex coordinates of the selected polygons by setting the coordinates of the vertexes of the first set of vertexes equal to the coordinates of the vertexes of the second set of vertexes wherein the number of vertexes of the first set of vertexes is reduced by setting in at least one instance the coordinates of at least two adjacent ones or said vertexes of said first set of vertexes equal to the coordinates of one of said vertexes of said second set.

12. The recording medium according to claim 1, wherein the number of vertexes of the first set of vertexes is reduced to K.

13. The recording medium according to claim 7, wherein the number of vertexes of the first set of vertexes is reduced to K.

14. The recording medium according to claim 8, wherein the number of vertexes of the first set of vertexes is reduced to K.

15. The 3D image processing device according to claim 9, wherein the number of vertexes of the first set of vertexes is reduced to K.

16. The 3D image processing method according to claim 10, wherein the number of vertexes of the first set of vertexes is reduced to K.

17. The game machine according to claim 11, wherein the number of vertexes of the first set of vertexes is reduced to K.

* * * * *